Nov. 4, 1958　　　L. MARTIN ET AL　　　2,859,246
METHOD OF DESULFURIZING A POLYMERIC BIS THIURAM DISULFIDE
Filed May 9, 1955
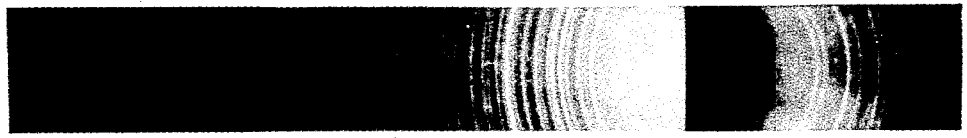
NABAM
FIG. I.
THIONEB
FIG. 2.
CALIBRATION SCALE IN ANGSTROM UNITS
FIG. 3.
INVENTORS
LOTHAR MARTIN
HAROLD R. CHIPMAN
CHARLES W. GATES
BY James J. Long
AGENT

United States Patent Office 2,859,246
Patented Nov. 4, 1958

2,859,246

METHOD OF DESULFURIZING A POLYMERIC BIS THIURAM DISULFIDE

Lothar Martin, Harold R. Chipman, and Charles W. Gates, Elmira, Ontario, Canada, assignors to United States Rubber Company, New York, N. Y., a corporation of New Jersey Application May 9, 1955, Serial No. 507,046

2 Claims. (Cl. 260—567)

This invention relates to an improved fungicide and to a method of making the same, as well as to an improved method of controlling fungi. More particularly, the invention relates to the preparation of a new fungicidal substance of unusual effectiveness, by a method involving desulfurization of a material thought to be a polymeric bis thiuram disulfide.

Fungicidal substances such as are contemplated by the invention are useful in agriculture and the industrial arts generally, for controlling the infectious or destructive action of fungi an organic materials, whether living tissues of plant life or non-living bodies such as leather and textiles.

One object of the invention is to provide a fungicidal composition of improved activity.

Another object is the provision of a new fungicide having systemic activity, i. e., having the ability to act through the physiological system of a plant.

Still another object is to provide a fungicide that has a broad spectrum of effectiveness, i. e., that is effective against a wide variety of fungi.

It is a further object of the invention to provide a method of making a highly active fungicide economically and efficiently.

Still a further object is to provide a fungicidal substance that can be applied to plants without destroying or seriously injuring the plants.

In the accompanying drawing:

Fig. 1 is a photographic reproduction of the X-ray diffraction pattern of a prior art material; viz., disodium ethylene bis dithiocarbamate, known as "nabam";

Fig. 2 is a similar reproduction of the X-ray diffraction pattern of the preferred fungicide of the invention, which we call "Thioneb"; and, Fig. 3 is a calibration scale for use as a standard of reference in conjunction with Figs. 1 and 2.

A number of organic compounds containing sulfur and nitrogen in the molecule have previously been known as fungicides. Thus, the salts of dithiocarbamic acids and especially of alkylene bis dithiocarbamic acids, have fungicidal activity, and some of the most effective presently employed commercial agricultural fungicides are based on metallic salts of ethylene bis dithiocarbamate. However, these materials are not without their limitations and there has therefore been a continuing demand for even better fungicidal agents, and to this end efforts have been made to derive more satisfactory materials from the bis dithiocarbamates. Thus, Klopping, in a thesis entitled "Chemical Constitution and Antifungal Action of Sulfur Compounds" rendered at the University of Utrecht in 1951 (published in English by Fa. Schotanus and Jens at Utrecht, Holland), described the oxidation of disodium ethylene dithiocarbamate to yield a material thought to be polymeric ethylene thiuram disulfide, but this substance unfortunately was found to be only about one-half as active as the parent substance. Other efforts along these lines have led to substances of academic interest only, since the methods necessary for arriving at such substances have been slow and cumbersome and out of the question as far as commercial practicality was concerned. Thus, Ludwig and Thorn, in an article entitled "Studies of the Breakdown of Disodium Ethylene Bisdithiocarbamate (Nabam)," Plant Disease Reporter, vol. 37, No. 3, March 15, 1953, pages 127–129, reported obtaining a small quantity of a fungicidal substance by long-term air oxidation of an extremely dilute solution of disodium ethylene dithiocarbamate.

We have now found, unexpectedly, that by subjecting to desulfurization certain oxidation products of salts of bis dithiocarbamic acids, which oxidation products are believed to be comprised of bis thiuram disulfides, there are obtained new chemicals containing significantly less sulfur and possessing unusual fungicidal activity, as well as important advantages not found in the parent substances. The chemical constitution of the new fungicides thus prepared is not known at the present time, but they can be identified by their physical properties, especially by their X-ray diffraction patterns, as will be explained in more detail below.

The starting polymeric bis thiuram disulfides suitable for use in making the fungicides of the invention consist of repeating units which may be represented by the following structural formula:

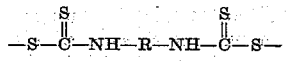

wherein R is a divalent organic radical such as ethylene, propylene, phenylene, as well as the radical

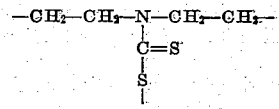

and similar alkylene, cycloalkylene or arylene radicals or combinations thereof.

In accordance with the invention the polymeric bis thiuram disulfide is treated with a desulfurization reagent under preferably only mildly basic conditions, with the result that an unusually active fungicidal substance is produced. The product is believed to be essentially a polymeric substance also, but it has proven difficult to determine the structure of the product, or even to assign a definite empirical formula to the product, since varying analyses are obtained in different batches and the analyses in general do not fit in well with any readily deducible structure. Although it is though to be significant that the material is, like the parent substance, basically polymeric, it is not known whether the enhanced fungicidal effect is attributable to the units per se comprising the polymer chain or whether there are certain end groupings on the polymer chain which are at least in part the source of the fungicidal behaviour. It is possible that the end groups of the polymer chain influence considerably the behaviour of the polymer, because the number of units in the polymer is evidently on the average only relatively small, and hence the end groups can constitute an appreciable proportion of the total molecule.

The starting materials of the invention, namely, the polymeric bis thiuram disulfides, are readily prepared by oxidation of corresponding bis dithiocarbamic acids, usually in the form of metal salts of the bis dithiocarbamic acids. Thus, the bis dithiocarbamate is oxidized in a solvent medium, suitably water, under close to neutral conditions. For this purpose any known acidic chemical oxidizing agent that is capable of generating oxygen at near neutral conditions is suitable, such as ammonium persulfate, hydrogen peroxide, nitrous acid, etc. Air oxidation per se is not suitable. Preferred oxidizing systems include mixtures of hydrogen peroxide and sulfuric acid, and mixtures of sodium nitrite and sulfuric acid. Such oxidizing materials are appropriately added gradually in the form of a dilute solution to the bis dithiocarbamate in the liquid medium, suitably at such a rate that the small pH of the reaction mixture remains generally between 6 and 8. If desired, buffers such as inorganic phosphates may be present. The reaction proceeds satisfactorily at room temperature, although with the stronger oxidizing agents it may be desirable to cool the mixture somewhat (for example, to a temperature of 5° C.) while the reaction may be facilitated with the weaker oxidizing agents by heating to a moderately elevated temperature (for example, to a temperature of 50° C.). The typical oxidization may be represented by the following equation:

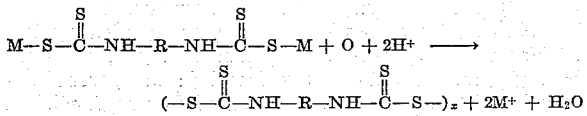

wherein R is a divalent organic radical as described above, M is a metal such as sodium, and $x$ is the number of units which are combined in the oxidized polymer. When continued addition of oxidizing agent causes the pH of the reaction mixture to drop to a value of 4 or less and the pH does not thereafter rise again when the addition of oxidizing agent is stopped, then it may ordinarily be assumed that the oxidation is substantially complete. The oxidized material appears as a precipitate.

As is well known, metal salts of bis dithiocarbamic acids, such as are utilized in the foregoing oxidation procedure, are readily obtainable by the action of carbon disulfide on amines, especially primary amines, and particularly primary diamines, such as ethylene diamines, 1,2-propylene diamine, 1,3-propylene diamine, paraphenylene diamine, as well as such compounds as diethylene triamine, followed by neutralization of the reaction mixture with sodium hydroxide or the like. Such procedures are well known and require no detailed description here. The preferred product of the invention is derived from the oxidation product of disodium ethylene dithiocarbamate, which dithiocarbamate is a commercially available material, known as "nabam."

In accordance with the invention, it has been found that the polymeric bis thiuram disulfides can be desulfurized to yield improved fungicidal products. More particularly it has been found that such improved products can be obtained by the action of an alkali metal cyanide on the polymeric bis thiuram disulfides. The desulfurization is preferably carried out by adding the sodium cyanide or other alkali metal cyanide, suitably dissolved in the minimum convenient quantity of an appropriate solvent such as water or alcohol, to the bis thiuram disulfide that is similarly contained in preferably the minimum convenient quantity of a suitable liquid medium, either aqueous or organic. The degree of desulfurization of the polymeric (bis thiuram disulfide) depends largely on the amount of the alkali metal (e. g. sodium or potassium) cyanide employed, and in general we utilize from about ½ mole to about 1.5 moles of sodium cyanide per unit mole of bis thiuram disulfide. In the case of the preferred product obtained from poly(ethylene thiuram disulfide), the desulfurized material ranges in sulfur content from about 48% to about 58%. This preferred product we call "Thioneb."

During the addition of sodium cyanide to the poly bis thiuram disulfide it has been found most advantageous to maintain the reaction conditions only mildly alkaline. This may be accomplished in general by not adding the sodium cyanide at an appreciably faster rate than it is consumed. The pH is suitably maintained well below 11, preferably below 10, and even more preferably below 9.

The desulfurization proceeds readily at room temperature and therefore it is not necessary to heat the reaction mixture, although the mixture may be heated if desired to any suitable elevated temperature to accelerate the reaction, care being taken not to heat the reaction mixture to such a high temperature that appreciable quantities of the starting material or of the product would be decomposed.

The desired product in general has a distinctly yellow color, which may range from fairly light yellow to very light yellow. In the case of the preferred product, viz., "Thioneb," obtained by desulfurizing poly(ethylene thiuram disulfide), the product melts over a rather indefinite range, which lies generally within the range of from 155° to 185° C. While it is believed that our product "Thioneb" may be a member of the thiuram family, it has proven difficult to characterize its structure with any certainty. It is known to contain sulfur, nitrogen, carbon and hydrogen, like the parent thiuram. The sulfur content is regarded as a more significant characteristic than the content of remaining elements, especially carbon and hydrogen. As indicated previously, the sulfur content generally ranges from 48% to 58%, and the nitrogen, carbon and hydrogen content similarly vary over a range. Taking the elementary analysis of various preparations of "Thioneb" at face value, one could calculate corresponding empirical formulas ranging from $C_8H_{12}N_4S_7$ to $C_{14}H_{26}N_8S_9$. However, such empirical formulas are not believed to give necessarily a true indication of the molecular structure of "Thioneb."

In view of the difficulty of assigning a definite structure to the present products, or even a definite empirical formula, and in view of the variations possible in melting point and other properties, we believe that the best means of characterizing or identifying our new fungicide is by means of its X-ray diffraction pattern. As is well understood by those skilled in the art of X-ray crystallography, the X-ray diffraction pattern of a material that can be obtained in crystalline form is a definite identifying characteristic of that material. The X-ray diffraction pattern of a material may thus be likened to a finger print of an individual, and the pattern is in general so complex and varies so for different materials that the likelihood of two really different substances having the same X-ray diffraction pattern is remote indeed. Laboratories which engage in X-ray crystallography as a means of chemical identification usually maintain an extensive classified file of X-ray diffraction patterns for numerous known substances. By taking the X-ray diffraction pattern of a given unknown substance, and comparing such pattern to the patterns of known materials, they are able to say definitely that the unknown does or does not correspond to any known substance. On the basis of such X-ray diffraction examination, we are able to state that insofar as we are aware our fungicide is a new chemical compound.

Thus, referring to the drawing, we show in Fig. 2 the X-ray diffraction pattern for our preferred product, "Thioneb," obtained as indicated by desulfurizing poly(ethylene thiuram disulfide), which is in turn obtained by oxidation of nabam (i. e., disodium ethylene dithiocarbamate). The X-ray diffraction pattern of "Thioneb" in Fig. 2 may be compared directly to the X-ray diffraction pattern of the original parent substance, nabam, shown in Fig. 1. Also for purposes of direct comparison and reference, there is shown in Fig. 3 a calibration scale, representing a calibration of the apparatus and method by which the diffraction patterns of Fig. 1 and Fig. 2 were obtained. Details of the X-ray diffraction apparatus and method are well known to those skilled in that art, and require no explanation here. The calibration scale of Fig. 3 can be used to read the interplanar distances in the crystals of Figs. 1 and 2 directly in angstrom units, and eliminates any necessity of specifying the dimensions of the apparatus, wave length of X-rays used, etc. Also, since Fig. 1 is a pattern of a well known material, nabam, this figure also represents a kind of calibration or standard of reference for the pattern of our new chemical shown in Fig. 2. The pattern of Fig. 1 shows numerous well-defined lines. This is typical of low molecular weight well crystallized organic compounds. Fig. 2 shows fewer well defined but somewhat broader lines. This is typical of a reasonably well crystallized polymatric material.

In the present circumstances, the X-ray diffraction pattern is an unusually valuable tool for identifying, characterizing, or defining "Thioneb," because the various preparations of this chemical, even though differing considerably in elementary analysis, apparent empirical formula, and melting point range, nevertheless still give the characteristic X-ray diffraction pattern shown, indicating that the different preparations are indeed basically the same new chemical substance.

For purposes of X-ray examination the "Thioneb" should of course be in crystalline form. When prepared as described the material will ordinarily be sufficiently crystalline (usually microcrystalline) to give a diffraction pattern, but, if necessary, the material may be recrystallized from a suitable solvent such as acetone or chloroform.

The following examples will serve to illustrate the practice of the invention in more detail.

EXAMPLE 1

Into a 3-liter, 4-necked flask equipped with an agitator, a thermometer and two graduated dropping funnels, 750 ml. of water was loaded. 670 grams of a 19% aqueous solution of nabam (disodium ethylene dithiocarbamate) was placed in one dropping funnel and 670 ml. of an aqueous solution containing 125 grams of ammonium persulfate was placed in the second dropping funnel. With efficient agitation equal volumes of the two solutions were added concurrently to the 750 ml. of water in the flask. The temperature of the reaction mixture was kept between 16° and 19° C. by external cooling. As the reaction proceeded a pale yellow precipitate was formed. The pH of the reaction mixture ranged between 6 and 6.6 throughout the addition. The rate of addition was adjusted so that the nabam solution was used up within two hours. At this point some ammonium persulfate solution remained. Portions of the remaining ammonium persulfate solution were added until the reaction was substantially complete as indicated by a drop of the pH to 4. Agitation was continued for ½ hour, after which the slurry was filtered to recover the thus-produced poly(ethylene thiuram disulfide).

The moist filter cake of poly(ethylene thiuram disulfide) was transferred to a 1-liter, 3-necked flask equipped with an agitator, a thermometer and a dropping funnel. 125 ml. of water and 75 ml. of acetone were added and the agitator was started. In the course of 1½ hours 75 ml. of an aqueous solution containing 30 grams of sodium cyanide was added slowly and the temperature was regulated at 25° by external cooling. The rate of addition of the sodium cyanide solution was such that the pH of the reaction mixture remained below 8 throughout the reaction. Agitation was continued for a period of 1 hour after the addition of the sodium cyanide solution was completed, and during this period the pH dropped to about 7. The insoluble yellow reaction product was filtered, washed free of inorganic salts and dried at a temperature between 50 and 55° C. The dried material ("Thioneb") weighed about 65 grams. It had a melting point range of from 157 to 170° C. with decomposition, and the analysis was as follows: S—51.3%; N—17.5%; C—27.3%; and H—3.12%. The product is practically insoluble in cold water and cold organic solvents. It is partly soluble in boiling acetone and chloroform. It is soluble with decomposition in strong alkali. It is stable at room temperature under normal storage conditions. Slow decomposition may occur if stored near excessive heat.

EXAMPLE 2

*Step 1.*—Materials:
 I. 15.2 liters (17.2 kg.) of a solution containing 19.9% disodium ethylene dithiocarbamate (nabam).
 II. 15.2 liters of an aqueous mixture containing 1.4 kg. of concentrated sulfuric acid and 1.6 liters of hydrogen peroxide 100 volume (27%).

Procedure: Into a 20 gallon glass lined reactor 10 liters of water was charged along with 1.2 liters of I. With agitation and external cooling I and II were added concurrently into the reactor over a period of 2 hours and 40 minutes. After all of I had been used up 1.2 liters of II was left over and was now added over a period of 10 minutes. The pH of the reaction mixture was between 7.5 and 8.1 throughout the concurrent addition, and dropped to 3.1 when the rest of II was added. The reaction temperature ranged from 13° to 19° C. The reaction mixture was now agitated for 1 hour and filtered. The slightly cream colored moist filter cake weighed 11 kg.

*Step 2.*—Materials:
 I. Moist filter cake from step 1.
 II. 1 kg. of acetone.
 III. 1.8 kg. of sodium chloride.
 IV. 3 liters of an aqueous solution containing 0.825 kg. of sodium cyanide.

Procedure: I, II, and III were placed in the 20 gallon reactor, and 1 kg. of water was added to make the slurry thin enough for adequate agitation. The temperature of this mixture was raised to 32° C. and over a period of 2 hours and 15 minutes, IV was added. The reaction temperature was controlled between 31 and 35° C. and the pH ranged from 7.1 to 7.4. After all IV had been added the mixture was cooled to 22° C. over a period of ½ hour. The yellow reaction mixture was filtered, the filter cake was washed until free of thiocyanate and dried at 54–57° C. 1.390 kg. of yellow product ("Thioneb") similar to that of Example 1 was obtained. The melting range was 158–172° C. with decomposition.

EXAMPLE 3

This example illustrates a variation in the method of the invention in which the poly(ethylene thiuram disulfide) is prepared in situ at the same time that desulfurization is carried out, that is, the oxidation of the nabam and the desulfurization are carried out concurrently in the same reaction vessel.

Reactions: | Grams
---|---
A. Water | 400
B. Ammonium persulfate | 62
   Water | 300
C. Nabam (19% aqueous solution) | 302
   Sodium cyanide | 15

The water A was first added to a 2-liter, 4-necked flask provided with a condenser, two addition funnels, an agitator and a thermometer. Solution B was added to one addition funnel, and solution C was added to the second addition funnel. The reactant solutions B and C were added concurrently to the well agitator reactor over a period of two hours, while the temperature ranged from about 21° C. to 35° C. The pH was mostly within the range of 6.8 to 7.3 during the addition, and in no case departed from the range 6.0 to 7.8. The reaction mixture was stirred for another two hours and then filtered. A bright yellow precipitate was collected. The dry weight of the filter cake was 55 grams. The filter cake was extracted with 200 cc. of acetone to give 24 grams of an acetone insoluble product as the residue. The product ("Thioneb") was yellow in color and had a melting range of 182–184° C.

EXAMPLE 4

This example illustrates desulfurization under substantially anhydrous conditions. 21 grams of dry poly(ethylene thiuram disulfide) and 100 ml. of methanol were placed in a 500 ml. three-necked flask equipped with an agitator, a thermometer and an addition funnel. Agitation was started and the mixture was warmed to 35° C. and held at this temperature while a solution of sodium cyanide in methanol (containing 5 grams of sodium cyanide per 100 ml.) was added dropwise. Spot tests with moist alkacid paper were taken frequently and the rate of cyanide addition was adjusted so that the pH of the reaction mixture was not higher than weakly basic. In this way 75 ml. of the cyanide solution were added over a three hour period. The mixture became orange-yellow and was agitated for one additional hour and filtered. The filter cake was washed with methanol and dried at room temperature. The yield was 10.5 grams of yellow material ("Thioneb") having a melting range of 168–171° C., a sulfur content of 49.7%, and a nitrogen content of 18.1%.

EXAMPLE 5

Into a 2-liter, 4-necked flask equipped with an agitator, thermometer and two graduated dropping funnels, 500 ml. of water was loaded. 50 ml. of a solution (containing 1.1 moles of disodium-1,2-propylene bis dithiocarbamate in 1500 ml. of solution) was placed in the flask and an additional 450 ml. of such solution was placed in one dropping funnel. An oxidizing solution was prepared containing 17 ml. of concentrated sulfuric acid and 39 ml. hydrogen peroxide (27%) per 500 ml. of solution. 450 ml. of the oxidizing solution was placed in the other dropping funnel.

With good agitation the solutions from the two dropping funnels were added concurrently to the flask over a period of 1½ hours. The temperature of the reaction mixture was controlled at 18–20° C. and the pH ranged between 6.7 and 7.0. After the two solutions in the dropping funnels had been consumed, and additional 125 ml. of the oxidizing solution was slowly added until completion of the reaction was indicated by a drop of the pH to 3.6.

Agitation was continued for 30 minutes, after which the white reaction product was filtered off. The wet filter cake, washed free of sulfate ions, weighed 259 grams. This product was the bis thiuram disulfide, poly (1,2-propylene thiuram disulfide).

197 grams of the wet filter cake from the previous step was transferred to a 1-liter, 3-necked flask equipped with an agitator, thermometer and an addition funnel. 103 ml. of water, 45 grams of sodium chloride and 22 ml. of acetone were added and agitation was started. The resulting slurry was warmed to 30° C. and held at 30–35° C. while 50 ml. of an aqueous solution of sodium cyanide (containing 20 grams sodium cyanide per 100 ml. of solution) was added over a period of 1 hour and 50 minutes. The pH of the reaction mixture ranged from 6.8 to 8.4. The slurry was then filtered. The filter cake was washed with water until free of thiocyanate, sucked dry and dried at room temperature. 22 grams of a yellow material was obtained, having a melting range from 84.5 to 88° C., a sulfur content of 46.8%, and a nitrogen content of 16.5%.

EXAMPLE 6

1500 ml. of an aqueous solution (I) containing one mole of trisodium diethylene tris dithiocarbamate was prepared.

Into a 2-liter, 4-necked flask equipped with an agitator, thermometer and two graduated dropping funnels, 500 ml. of water was loaded. 50 ml. of I were added and an additional 450 ml. of I was transferred into one dropping funnel. An oxidizing solution (II) was prepared containing 27 ml. of concentrated sulfuric acid and 59 ml. of hydrogen peroxide (27%) per 500 ml. of solution. 450 ml. of II was transferred into the other dropping funnel.

With good agitation the solutions I and II from the two dropping funnels were added concurrently to the flask over a period of one hour and twenty minutes. The pH of the reaction mixture ranged between 7.2 and 7.5 and the temperature was controlled at 17–21° C. After the two solutions in the dropping funnels had been consumed, then an additional 50 ml. of II was added until completion of the reaction was indicated by a drop of pH to 3.1.

Agitation was continued for 30 minutes, then the white reaction product was filtered off. The wet filter cake, washed free of sulfate ion, weighed 412 grams.

310 grams of the foregoing wet filter cake was transferred into a 1-liter, 3-necked flask equipped with an agitator, thermometer and addition funnel. 190 ml. water, 97 grams of sodium chloride and 50 ml. of acetone were added, and agitation was started. The resulting slurry was warmed to 35° C. and held at this temperature while 35 ml. of an aqueous solution of sodium cyanide (containing 20 grams of sodium cyanide per 100 ml.) was added over a period of 1¾ hours. The pH of the reaction mixture was relatively high (8.5–8.7) indicating a slow reaction. After standing overnight the pH had dropped to 7.6. An additional 15 ml. of cyanide solution was then added over a ½ hour period. Agitation was continued for ½ hour, then the reaction mixture was filtered. The filter cake was washed with water until free of thiocyanate, sucked dry and dried at room temperature. 38 grams of a cream colored product was obtained, having a melting range of 96–100° C., and a sulfur content of 49.6%.

EXAMPLE 7

A solution of disodium p-phenylene bis dithiocarbamate was prepared by reaching 0.5 mole p-phenylenediamine in aqueous solution with 1.1 moles carbon disulfide at 40–45° C., then slowly adding 1 mole of sodium hydroxide in aqueous solution, keeping the temperature between 40 and 45° C. After standing overnight the excess carbon disulfide was removed and the solution was filtered.

Step I.—In a 2-liter, 4-necked flask equipped with agitator, thermometer and two dropping funnels 300 ml. water and 50 ml. of a 0.5 molar solution (I) of disodium p-phenylene-bis dithiocarbamate were mixed. By means of the two dropping funnels 450 ml. I and 450 ml. of an acid oxidation mixture (II) being 0.5 molar with respect to sulfuric acid and 0.504 molar with respect to hydrogen peroxide were added concurrently over a 3 hour period, keeping the reaction temperature below 20° C. Additional 105 ml. II had to be added to finish the reaction, as indicated by a drop of the pH to 4.2. The nearly white reaction product was filtered and washed with water. The moist filter cake weighed 142 grams. This material was p-phenylene bis thiuram disulfide polymer.

Step II.—Into a 1-liter, 3-necked flask equipped with agitator, thermometer and dropping funnel 114 grams of the moist filter cake of step I was transferred and 70 ml. water were added to make a flask slurry. 18 ml. acetone and 20 grams sodium chloride were added, and the mixture was warmed to 30° C. Over a period of 2 hours 50 ml. of a solution containing 10 grams sodium cyanide were added with good agitation. The temperature of the reaction mixture was controlled between 28 and 30° C., and the pH stayed below 8.0. When all the cyanide had been added the mixture was agitated for 30 minutes, cooled to room temperature and filtered. The cream colored reaction product was washed with water until free of thiocyanate, and dried at room temperature. The dry product weighed 31 grams. The material did not melt up to 230° C.

The "Thioneb" and other fungicidal products of the invention may be used in any desired conventional manner for control of fungus on infected plants, or for preventing plants or soil from becoming infected. It may be used to protect plant life such as healthy seed and to disinfect diseased seed, as by tumbling with the chemical alone, or with the chemical admixed with a powdered solid carrier, such as the various mineral silicates, e. g. mica, talc, pyrophyllite or clays. It may also be applied to the seeds in admixture with a conventional surface-active dispersing agent, with or without additional powdered solid carrier, as by first wetting the mixture with a small amount of water and then tumbling the seeds in the slurry. It may be applied to plants as a liquid or spray in a liquid carrier, as suspended in a suitable non-solvent, for example, water. In foliage treatment, the "Thioneb" or other fungicidal product of the invention may be applied to the plants by spraying with an aqueous suspension of the chemical containing a surface-active dispersing agent. The "Thioneb" may be admixed with powdered solid carriers, such as mineral silicates, together with small amounts of a dispersing agent so that a wettable powder is obtained which may be applied directly to loci to be protected against fungi, or which may be shaken up with water to form a suspension of the chemical (and powdered carrier) in water for application in that form.

The desulfurized products of the invention, prepared as described in the above working examples, have been amply demonstrated by extensive tests to possess fungicidal activity. In particular, the desulfurized product "Thioneb," obtained from the polymeric ethylene thiuram disulfide as indicated, is an unusually active fungicide. It has a long lasting effect and is not readily washed off the plant. An unusual feature of "Thioneb" is that it is capable of acting systemically. It is highly effective against numerous forms of fungi. The relationship of the activity of "Thioneb" to concentration is highly favorable, that is, it is highly active even at extreme dilutions, and minimum concentrations produce an unusual degree of fungus control. The following examples will serve to illustrate the fungicidal activity of our products.

EXAMPLE 8

*Foliage spray test (tomato blight)*

The chemicals to be tested were each ground with 1% of alkyl phenoxy polyoxyethylene ethanol (a commercial material known as Igepal CA630), a surface-active agent known to be non-toxic to the pathogen used in this test. The mixtures of the compounds and surface-active dispersing agent were then agitated in distilled water to form aqueous suspensions of the compounds. Duplicate six-inch tomato plants of the variety Bonny Best were sprayed for 20 seconds at 20 pounds air pressure with the aqueous suspensions. After the spray deposit was thoroughly dry (20 hours) the plants and four comparable untreated (check) plants were sprayed with an aqueous suspension of spores of the early blight fungus, *Alternaria solani*. The plants were held for 20 hours at 75° F. and 99% relative humidity to permit spore germination and infection before removing them to a greenhouse. Records were taken five days later on the number of lesions produced on the 15 major leaflets of the three oldest fully expanded leaves. The data were converted to percentage of control on the basis of the average number of lesions on the four check plants. Data are shown in Table I.

TABLE I

| Material | LD 95 [1] (based on 5 dosages) |
| --- | --- |
| "Thioneb" | 30 |
| "A5I [2]" | 95 |
| "Zineb" | 200 |
| "Dichlone" | 40 |

[1] P. p. m. of suspension required to give 95% disease control.
[2] Chemically oxidized nabam [i. e. poly(ethylene bis thiuram disulfide)].

It will be apparent from the foregoing data that the fungicide of the invention, "Thioneb," is far more active than the parent substance poly(ethylene bis thiuram disulfide) from which it is obtained by desulfurization as described. Also, the "Thioneb" is more patent than the conventional fungicides "Zineb" (zinc ethylene bis dithiocarbamate) and "Dichlone."

In a similar manner other products of the invention were shown to have fungicidal activity. For example, the desulfurized material of Example 5, obtained from poly(1,2-propylene thiuram disulfide), was found to have an LD95 of 180. It is interesting to note that a product known as "GD26," prepared by air oxidation of a dilute aqueous solution of nabam as described by Ludwig and Thorn, above cited, had in a similar test an LD95 of 200, indicating inferior activity to "Thioneb." It is also interesting that efforts to desulfurize "GD26" with sodium cyanide in accordance with the procedure of this invention also gave only a material considerably less active than "Thioneb."

EXAMPLE 9

*Seed protectant test*

The chemicals to be tested were finely ground and applied dry to hybrid field corn seed at the rate of 16 and 4 ounces of compound per 100 pounds of seed. Distribution of the fungicide on seed surface was accomplished by tumbling seed plus fungicide in a glass jar for 30 minutes on a seed treatment wheel. Using a planned randomization scheme, 8 replicates of 25 seeds each were then planted in flats containing naturally contaminated soil, including *Pythium ultimum*. The flats of seed were then placed in a cold chamber and maintained at 50° F. and 99–100% humidity for 14 days. After removal from the cold chamber, the flats were placed in the greenhouse at 75° F. to complete emergence. The effectiveness of the compounds as fungicides is shown by the number of seeds which germinated and developed into healthy plants compared with those which were untreated. Data are shown in Table II.

TABLE II

| Dosage (ozs./100# seed) | Percent Emergence at Dosage | | | | | |
| --- | --- | --- | --- | --- | --- | --- |
| | "Thioneb" | "GD26" | "A5I" | "Zineb" | "Dichlone" | Check |
| 16 | 74 | 51 | 53 | 23 | 65 | 0 |
| 4 | 63 | 49 | 47 | 8 | 43 | 0 |

EXAMPLE 10

*Foliage spray test (bean rust)*

The chemicals to be tested were each ground with 1% of alkyl phenoxy polyoxyethylene ethanol ("Igepal" CA630), a suface-active agent known to be non-toxic to the pathogen used in this test. The mixtures of the compounds and surface-active dispersing agent were then agitated in distilled water to form aqueous suspensions of the compounds. Duplicate bean plants, variety Pinto, at the 2-leaf stage when the trifoliate leaves were about ¾ expanded, were sprayed for 20 seconds at 20 pounds air pressure with the aqueous suspensions. After the spray deposit was thoroughly dry (24 hours) the plants and four comparable untreated checks were sprayed with an aqueous suspension of the rust fungus, *Uromyces phaseoli*. The plants were held for 20 hours at 75° F. and 99% relative humidity to permit spore germination and infection before removing them to a greenhouse. Records were taken two weeks later on the total number of lesions produced on the test plants. The data were converted to percentage of control on the basis of the average number of lesions on the four check plants.

Data are shown in Table III.

TABLE III

| Spray Dosage (p. p. m.) | Percent Bean Rust Control at Dosage | | | | |
|---|---|---|---|---|---|
| | "Thioneb" | "A5I" | "Zineb" | "Dichlone" | Check |
| 100 | 100 | 85 | 60 | 90 | 0 |
| 50 | 100 | 50 | 60 | 95 | 0 |

EXAMPLE 11

*Verticillium wilt test (systemic)*

This test was undertaken to demonstrate the systemic action of "Thioneb." Tomato seedlings, about 3 inches high, were transplanted from soil to sand, and watered twice a week for three weeks with a complete nutrient solution (Hoagland's solution). Triplicate plants were then watered once a day for three days with 100 ml. of a 100 p. p. m. suspension of the chemicals to be tested. At the end of the third day the test plants were inoculated with *Verticillium albo-atrum* by injecting the disease into the base of the main stem of the plants. Treatment with the nutrient solution was then continued for three weeks until acute leaf symptoms of the disease were observable. Records were taken of the percentage of leaf yellowing, wilting, and stunting of the plant and the amount of vascular discoloration in relation to the untreated inoculated and uninoculated check plants.

Data are shown in Table IV.

TABLE IV

| Fungicide Dosage, p. p. m. | Percent Verticillium Wilt Control at Dosage | | |
|---|---|---|---|
| | "Thioneb[1]" | "GD 26" | Check |
| 100 | 50 | 0 | 0 |

[1] A marginal chlorosis of the lower leaves occurred on the "Thioneb"-treated plants indicating that the chemical was taken up by the roots of the plant.

It will be apparent from the foregoing data that the product of the invention displayed systemic activity, whereas the air-oxidized nabam "(GD-26)" did not. It is also desired to point out that "GD-26" does not give the same X-ray diffraction pattern as "Thioneb," further confirming that "GD-26" is a completely different material.

In other tests, "Thioneb" showed an LD95 rating, based on greenhouse application to early blight of tomatoes, of 22. No injury has been reported to plants, fruit trees and flowers sprayed at the normal rate of 2 lbs. of 50% wettable powder per 100 gallons of spray (1000 p. p. m. active ingredient). In the greenhouse beans and tomatoes sprayed at 8000 p. p. m. (8 times the normal rate) gave no evidence of plant injury.

It will be understood that the X-ray diffraction patterns discussed herein are made from powdered samples by standard powder diffraction procedures.

Having thus described our invention, what we claim and desire to protect by Letters Patent is:

1. A method of making an improved fungicide comprising desulfurizing a polymeric bis thiuram disulfide by treating one mole of said disulfide with from one-half to 1.5 moles of an alkali metal cyanide.

2. A method of making an improved fungicide comprising desulfurizing poly(ethylene thiuram disulfide) by treating one mole of said disulfide with from one-half to 1.5 moles of an alkali metal cyanide.

References Cited in the file of this patent

FOREIGN PATENTS 919,350    Germany  ---------------- Oct. 21, 1954